Dec. 2, 1941.  J. S. FISHER  2,264,516
CALENDAR
Filed Feb. 14, 1940
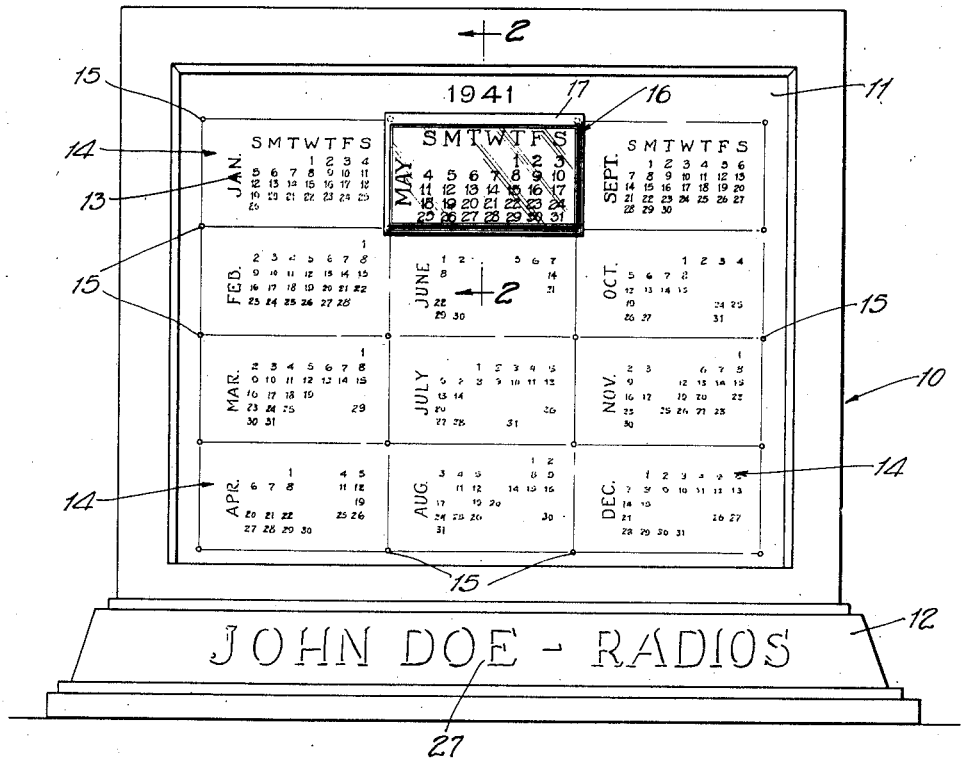
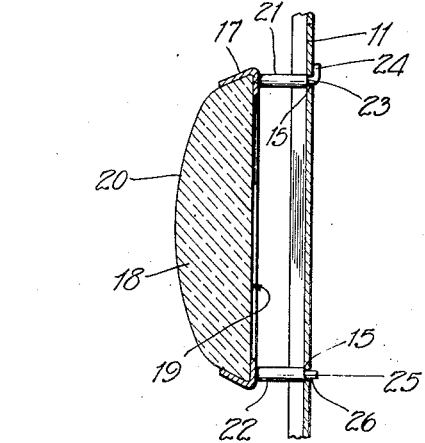
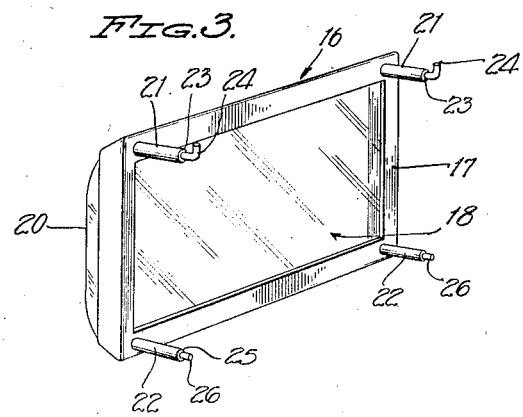
JOSEPH S. FISHER.
INVENTOR.

Patented Dec. 2, 1941

2,264,516

UNITED STATES PATENT OFFICE 2,264,516

CALENDAR

Joseph S. Fisher, New York, N. Y.

Application February 14, 1940, Serial No. 318,851

2 Claims. (Cl. 40—110)

This invention relates to improvements in calendars and particularly to that type of calendar which displays all twelve months of a calendar year.

There are many advantages derived from the use of calendars which are known as "twelve months at a glance" type, for the user may readily refer to the days of past and future months in addition to the current month. However to make this type calendar for desk use, the numerals representative of the days of the months must be printed in relatively small type which makes them difficult to read without picking up the calendar and bringing it closer to the eyes of a user. It is therefore one of the important features of this invention to frame the current month of a "twelve months at a glance" calendar with a magnifying glass, which enlarges the current month to facilitate easy reading of the printed matter representative of the current month, the framing of the current month also acting to immediately attract the eye of a user to the current month which eliminates the loss of time and annoyance of scanning the calendar in an endeavor to locate it among the other eleven months.

Another feature of the invention resides in a novel means of removably supporting the magnifying glass in a rigid position over any one of the twelve calendar months which are printed or inscribed upon the face of a rigid frame.

A further feature of the invention is to provide a calendar of the kind set forth above which is inexpensive of manufacture, and which may contain an advertisement, thus making the article attractive as a good-will advertising item.

Other features of the invention will become apparent as the following specification is read in conjunction with the accompanying drawing, in which:

Figure 1 is a front elevational view of the calendar illustrating the magnifying device in framing position over the month of May.

Fig. 2 is an enlarged detail vertical sectional view on the line 2—2 of Figure 1.

Figure 3 is a perspective view of the magnifying device per se.

Referring to the drawing by reference characters, the numeral 10 designates my improved calendar in its entirety, and which includes a flat upstanding panel 11 which may be made of sheet metal, plastic, or other rigid material. The panel 11 is shown as being mounted upon a flat base 12, although the same may be supported in a hung position from a wall if desired. The base 12 makes the calendar adaptable for desk use, and while I have illustrated the panel 11 as extending vertically from the base, the same may be slightly tilted in a rearward direction if desired.

Printed or otherwise inscribed upon the front face of the panel 11 are the respective calendar months of a year, which are designated 13, and each calendar month 13 is disposed in a substantially rectangular area 14, the areas being boxed in by pin receiving openings 15 which are located at the corners of the areas 14. The openings 15 between adjacent areas are common to such areas for reasons to be hereinafter appreciated.

In a desk calendar of this type, the calendar indicia of the calendar month is relatively small, which makes it difficult to read at a distance, and it is the purpose of this invention to enlarge the calendar indicia of a current month by positioning a magnifying device over the current month. The magnifying device is designated in its entirety by the numeral 16 and comprises a rigid rectangular frame 17 of a size and shape corresponding initially to that of the calendar area 14. Mounted in the frame 17 is a magnifying glass or lens 18, the same having a flat rear face 19 and a convex front face 20. Extending rearwardly from the frame 17 at the four corners thereof are upper pins 21 and lower pins 22. The terminal ends of the pins 21 are reduced in cross section to provide stop shoulders 23, the said reduced terminal ends being bent upwardly to form hook portions 24. The free ends of the pins 22 are also reduced in cross section to provide shoulders 25, the reduced terminal ends of the pins 22 being straight and designated 26.

In practice, the magnifying device 16 is hung over the current calendar month, and in Figure 1 of the drawing, it is hung over the month of May. To attach the magnifying device 16 to the panel 11, the operator inserts the hook portions 24 into the upper set of openings 15 which alines the straight portions 26 of the lower set of pins 22 with the lower openings 15. The stop shoulders 23 and 25 abut the outer face of the panel 11 as shown in Figure 2, and the hook portions 24 engage behind the panel. Thus the magnifying device 16 is rigidly supported over the current month in framing relation therewith, and with the magnifying glass 18 held in spaced relation to the panel in order to effect a focus of the magnifying glass relative to the calendar indicia which appears therebehind. Thus the calendar indicia of the month of May is enlarged to the eye of a person referring to the calendar, and which makes the calendar indicia of the current month clearly visible at a distance. It will of course be understood that as a month passes, the magnifying device 16 is unhooked and removed from its position over the previous month, and is again attached to the panel in order to frame the new current month.

If the calendar is manufactured for distribution in good-will advertising, the base 12 may have an ad. 27 printed or otherwise inscribed thereon.

While I have shown and described what I consider to be the most practical embodiment of my invention, I wish it to be understood that such changes and alterations as come within the scope of the appended claims may be resorted to if desired.

Having thus described the invention, what I claim as new and desire to secure by Letters Patent of the United States, is:

1. A calendar comprising in combination, a panel having the calendar months of a year arranged thereon and disposed in like rectangular shaped areas, each calendar month being boxed-in by a set of four openings provided in said panel, a magnifying device adapted to be selectively positioned and supported forwardly of any one of the calendar months, said magnifying device including a frame of a size and shape as that of each rectangular shaped area, a magnifying glass mounted in said frame, pins extending from the rear of said frame equal in number to the number of openings in each set and correspondingly spaced for fitting into any set of openings, interengaging means between certain of the pins and the panel for preventing accidental separation of the magnifying device from said panel, and stop means for limiting the insertion of the pins through the openings to maintain the magnifying glass in spaced focus arrangement relative to the selected calendar month over which the magnifying device is arranged.

2. A calendar comprising in combination, a rigid panel having the twelve calendar months of a year arranged in rectangular shaped areas thereon, each area having a set of pin receiving openings which are respectively disposed at the corners thereof, a magnifying device adapted to be hung upon said panel to frame and magnify a current month, said magnifying device including a rectangular shaped frame of a size to frame any one of the calendar months, a magnifying glass in said frame, pins extending from the rear of said frame at the corners thereof for reception in any set of the openings, upwardly extending hook portions on the terminal ends of the upper corner pins for hooking engagement behind said panel, and stop elements on said pins engageable with the front of said panel for spacing the magnifying glass from said panel to maintain the same in focused relation to the selected calendar month over which the magnifying device is hung.

JOSEPH S. FISHER.